United States Patent
Villalobos Laurent et al.

(10) Patent No.: US 11,483,407 B1
(45) Date of Patent: Oct. 25, 2022

(54) ENVIRONMENT SHARING

(71) Applicant: INTERNATIONAL BUSINESS MACHINES CORPORATION, Armonk, NY (US)

(72) Inventors: Alonso Andres Villalobos Laurent, Sabana Sur (CR); Sean Thomas Fornash, Hudson, NH (US); Ricardo Golcher Ugalde, Residencial Llanos del Sol (CR); Farid Fuleihan, Westford, MA (US); Christopher Kevin Vissuskus, Hampstead, NC (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 17/509,266

(22) Filed: Oct. 25, 2021

(51) Int. Cl.
*H04L 67/52* (2022.01)
*H04L 67/12* (2022.01)

(52) U.S. Cl.
CPC .............. *H04L 67/52* (2022.05); *H04L 67/12* (2013.01)

(58) Field of Classification Search
CPC ................................ H04L 67/18; H04L 67/12
See application file for complete search history.

(56) References Cited

U.S. PATENT DOCUMENTS

| | | | |
|---|---|---|---|
| 2013/0325325 A1* | 12/2013 | Djugash | G01C 21/3697 701/425 |
| 2015/0339951 A1* | 11/2015 | Stevens | G06V 20/10 348/62 |
| 2019/0170524 A9 | 6/2019 | Sullivan | |
| 2020/0175767 A1* | 6/2020 | Stivi | G08B 25/10 |
| 2020/0273277 A1* | 8/2020 | Kerning | H04W 4/90 |
| 2021/0043063 A1 | 2/2021 | Benoit et al. | |

OTHER PUBLICATIONS

Mell et al., "The NIST Definition of Cloud Computing", NIST, Special Publication 800-145, Sep. 2011, 7 pages.
Yanzi Zhu et al., "Object Recognition and Navigation using a Single Networking Device", Department of Computer Science, UC Santa Barbara, Jun. 19-23, 2017, 13 pages.
Yu-Chih Tung et al., "Use of Phone Sensors to Enhance Distracted Pedestrians' Safety", DOI 10.1109/TMC.2017.2764909, IEEE Transactions on Mobile Computing, 2017, 14 pages.

(Continued)

*Primary Examiner* — Normin Abedin
(74) *Attorney, Agent, or Firm* — Andrew M. Calderon; Calderon Safran & Cole, P.C.

(57) ABSTRACT

A method includes receiving, by a computing device, determining, by a computing device, a location of a user device; retrieving, by the computing device, public information from public sources using the location of the user device; providing, by the computing device, the public information to the user device; locating, by the computing device, environment devices within an environment of the user device using the location of the user device; collecting, by the computing device, data from the environment devices; determining, by the computing device, whether obstacles are present in the user environment using the collected data and the public information; and providing, by the computing device, alerts to the user device about the obstacles.

20 Claims, 5 Drawing Sheets

(56) References Cited

OTHER PUBLICATIONS

Dominik Bosnjak, "Samsung's Walk Mode App Wants to Stop You Using Your Phone", https://www.androidheadlines.com/2017/06/samsungs-walk-mode-app-wants-to-stop-you-using-your-phone.html, Jun. 29, 2017, 3 pages.

Frankie McCoy, "Type While Walk: the app that will stop you from bumping into things", Evening Standard, https://www.standard.co.uk/lifestyle/london-life/type-while-walk-theapp-that-will-stop-you-from-walking-into-traffic-a3290126.html, Lifestyle, London Life, Jul. 7, 2016, 7 pages.

\* cited by examiner

US 11,483,407 B1

ENVIRONMENT SHARING

BACKGROUND

Aspects of the present invention relate generally to computing devices and, more particularly, to environment sharing.

Mobile devices, such as smartphones, augmented reality (AR) devices, and virtual reality (VR) devices, are all relatively powerful tools with many uses and interesting applications.

SUMMARY

In a first aspect of the invention, there is a computer-implemented method including: determining, by a computing device, a location of a user device; retrieving, by the computing device, public information from public sources using the location of the user device; providing, by the computing device, the public information to the user device; locating, by the computing device, environment devices within an environment of the user device using the location of the user device; collecting, by the computing device, data from the environment devices; determining, by the computing device, whether obstacles are present in the user environment using the collected data and the public information; and providing, by the computing device, alerts to the user device about the obstacles.

In another aspect of the invention, there is a computer program product including one or more computer readable storage media having program instructions collectively stored on the one or more computer readable storage media. The program instructions are executable to: determine a location of a user device; retrieve public information from a public database using the location of the user device; provide the public information to the user device; locate environment devices within an environment of the user device using the location of the user device; collect data from the environment devices; determine whether obstacles are present in the user environment using the collected data and the public information; and provide alerts to the user device about the obstacles.

In another aspect of the invention, there is system including a processor, a computer readable memory, one or more computer readable storage media, and program instructions collectively stored on the one or more computer readable storage media. The program instructions are executable to: determine a location of a user device; retrieve public information from public networks using the location of the user device; provide the public information to the user device; locate environment devices within an environment of the user device using the location of the user device; collect data from the environment devices; analyze the collected data using a machine learning model; determine whether obstacles are present in the user environment using the analyzed data and the public information; and provide alerts to the user device about the obstacles.

BRIEF DESCRIPTION OF THE DRAWINGS

Aspects of the present invention are described in the detailed description which follows, in reference to the noted plurality of drawings by way of non-limiting examples of exemplary embodiments of the present invention.

DETAILED DESCRIPTION

Figure 1:
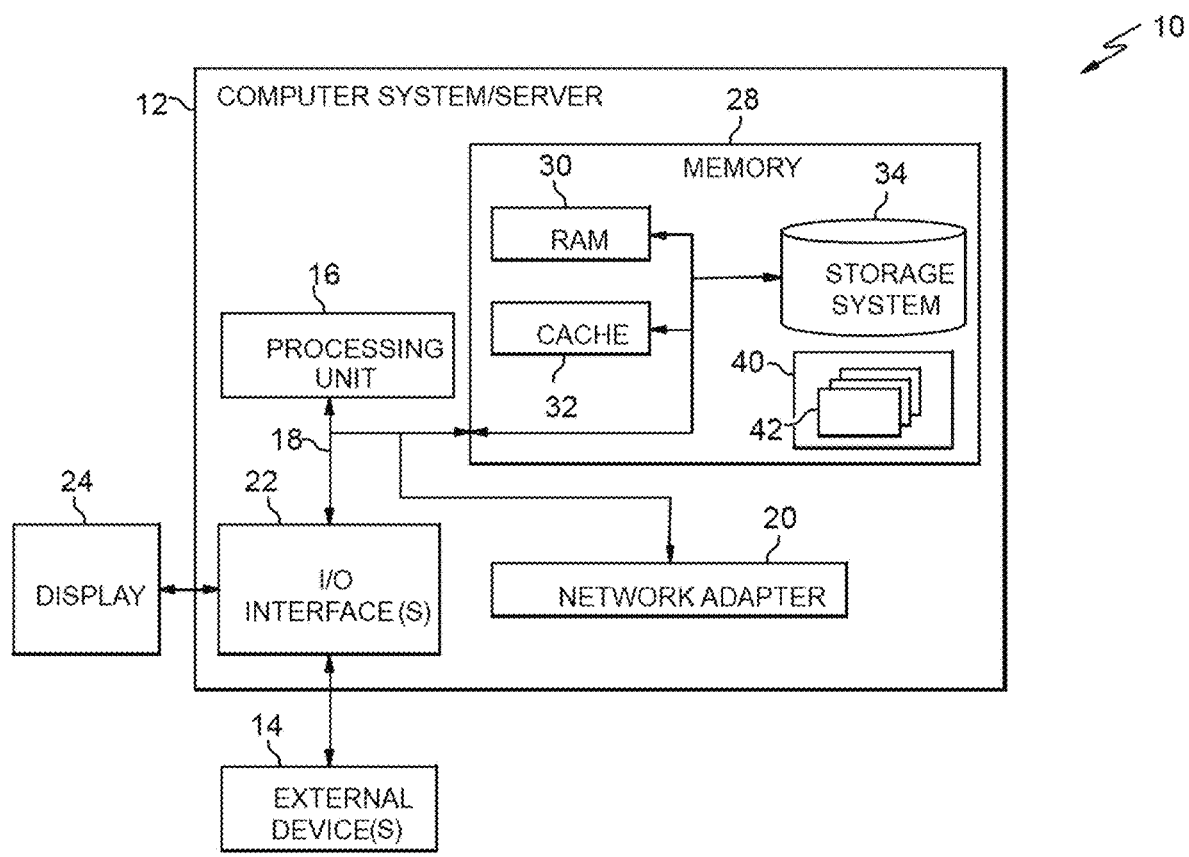
FIG. 1 depicts a cloud computing node according to an embodiment of the present invention.

Aspects of the present invention relate generally to computing devices and, more particularly, to environment sharing. According to aspects of the invention, a user is traversing an environment. In embodiments, the systems and processes capture information in an immediate proximity of the user using sensors of a user's mobile device. In further embodiments, the systems and processes combine the information from the user device with other information from devices close by, thereby creating more information for analysis to determine obstacles in the environment. In this manner, implementations of the invention allow for a user to navigate an environment relatively safely.

In embodiments, the systems and processes provide a relatively safe path for a user to traverse between two locations. In embodiments, the systems and processes gather location and/or destination information from a user's device. Further, the systems and processes interact with a plurality of additional devices within a range of the user's device and within a path of a destination of a user. In embodiments, the plurality of additional devices include Internet-of-Things (IoT) devices including various sensors and cameras on the IoT devices, and the plurality of additional devices also include intelligent vehicles, and the like. In embodiments, the systems and processes obtain additional available data based on the location of the user, wherein the additional available data includes publicly available data (e.g., street camera, online map data, blueprints etc.), and data from Wi-Fi networks. In embodiments, the systems and processes notify the user of an obstruction in the path, wherein the obstruction is identified by analyzing each source of data to identify potential hazards (e.g., tripping hazard in a direct path of movement of the user).

Implementations of the invention allow for a practical application of a user to traverse an environment relatively safely by avoiding obstacles. In embodiments, the systems and processes described herein utilize sensors on a user device to gather location information of the user. In embodiments, the systems and processes use the location information of the user to locate other devices within a proximity of the user. In response to locating the other devices, the systems and processes collect data from the other devices. The systems and processes then perform analysis on the data to determine whether any obstacles are present in the environment. In embodiments, the systems and processes provide the analysis to the user through the user device. Accordingly, the systems and processes described herein provide the practical application of allowing a user to traverse an environment relatively by notifying a user of obstacles within the environment, thereby allowing the user to avoid the obstacles in the environment.

It should be understood that, to the extent implementations of the invention collect, store, or employ personal information provided by, or obtained from, individuals (for example, a user location), such information shall be used in accordance with all applicable laws concerning protection of personal information. Additionally, the collection, storage, and use of such information may be subject to consent of the individual to such activity, for example, through "opt-in" or "opt-out" processes as may be appropriate for the situation and type of information. Storage and use of personal information may be in an appropriately secure manner reflective of the type of information, for example, through various encryption and anonymization techniques for particularly sensitive information.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium or media, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
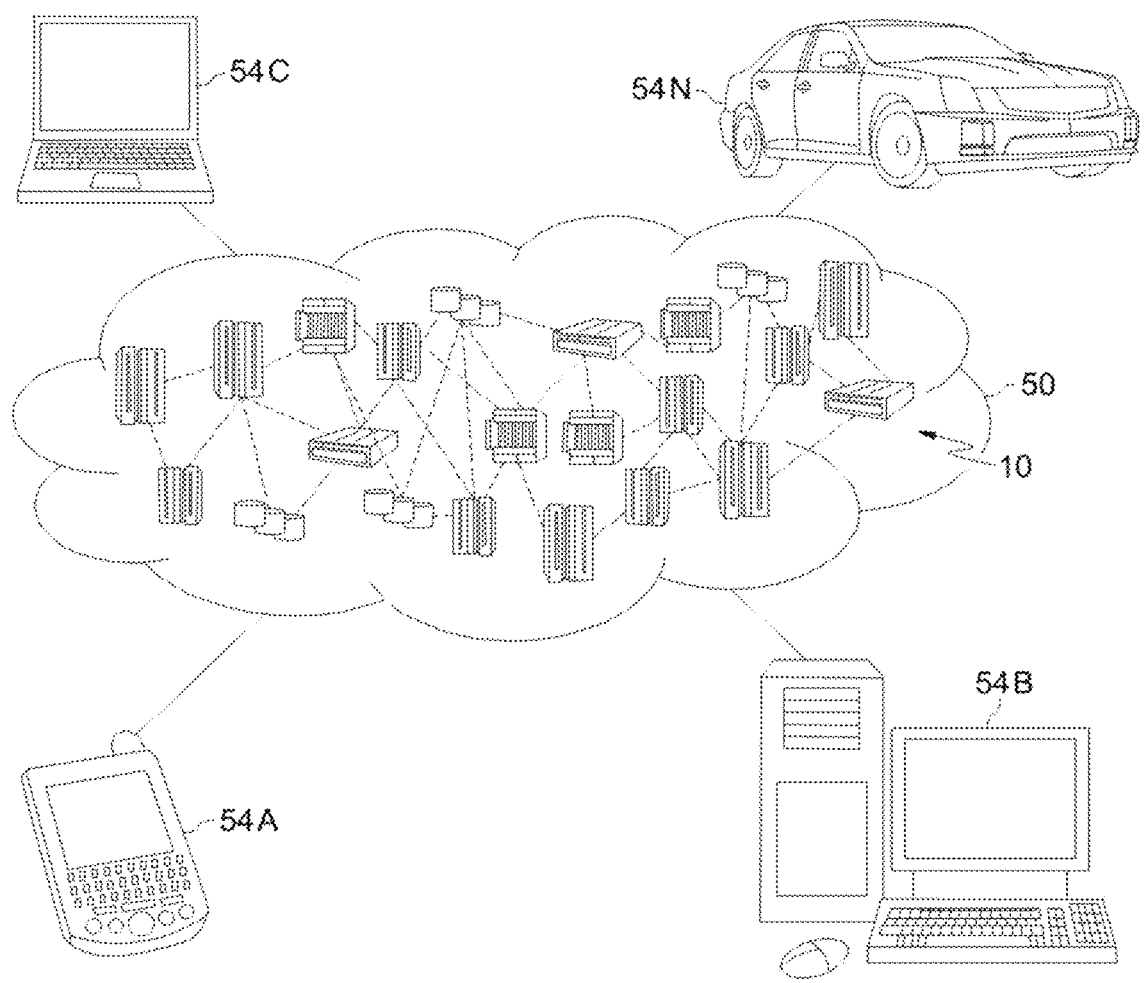
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
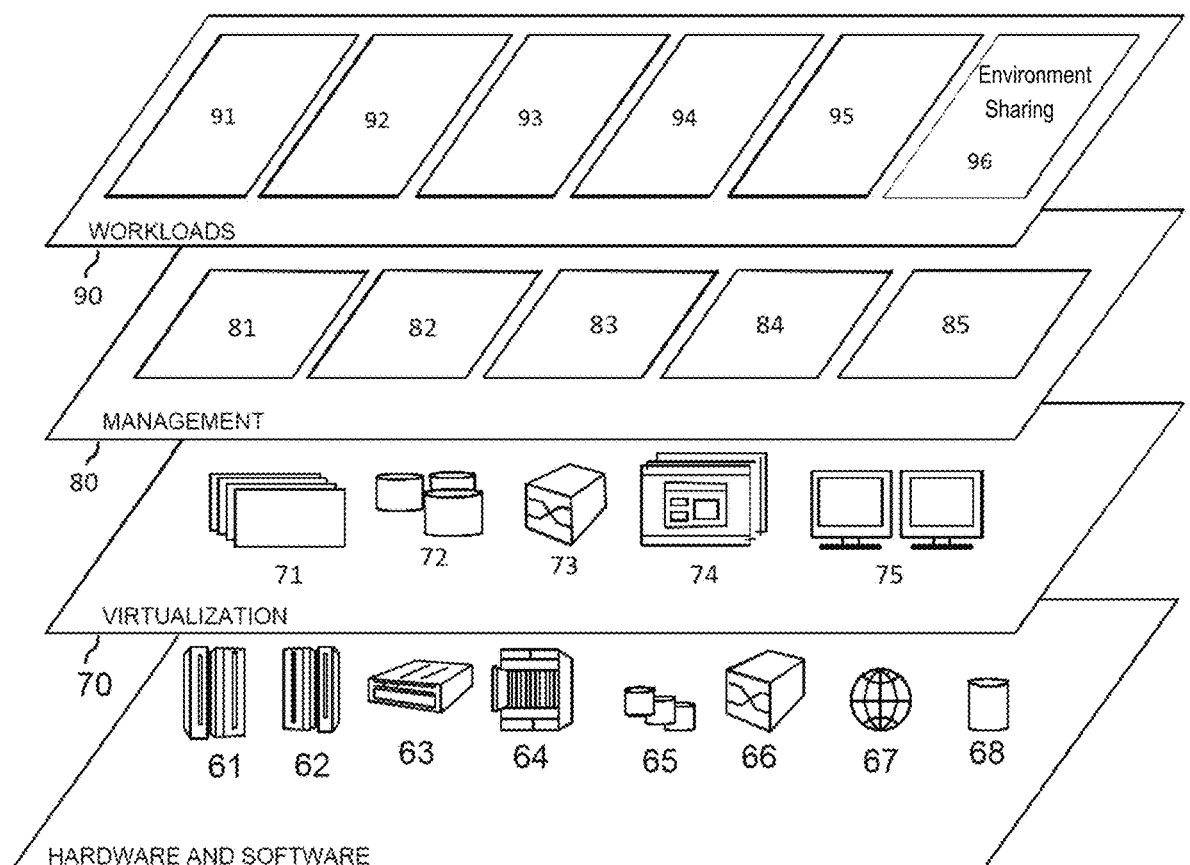
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and environment sharing 96.

Implementations of the invention may include a computer system/server 12 of FIG. 1 in which one or more of the program modules 42 are configured to perform (or cause the computer system/server 12 to perform) one or more functions of the environment sharing 96 of FIG. 3. For example, the one or more of the program modules 42 may be configured to: a) determine a location of a user device; b) locate environment devices in proximity to the user device using the location of the user device; c) collect data from the environment devices; d) analyze the data from the environment devices; and e) provide the analysis to the user device.

Figure 4:
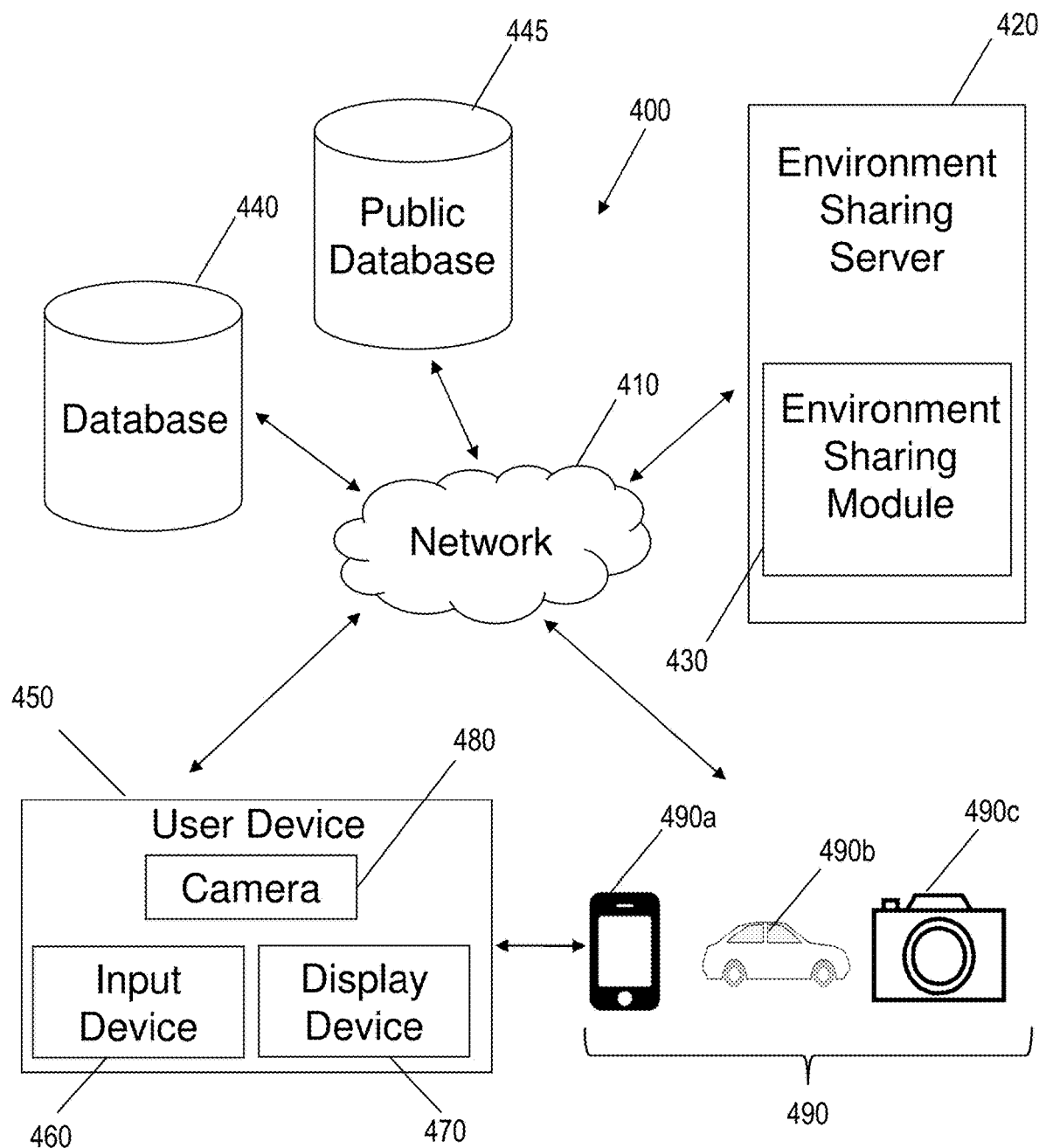
FIG. 4 shows a block diagram of an exemplary environment in accordance with aspects of the invention.

FIG. 4 shows a block diagram of an exemplary environment 400 in accordance with aspects of the invention. In embodiments, the environment 400 includes a network 410, an environment sharing server 420, a database 440, a public database 445, and a user device 450 having an input device 460, a display device 470, and a camera 480. In embodiments, the public database 445 is an Internet database of public information for a location that the user device 450 is in. In further embodiments, the environment 400 includes environment devices 490 including devices 490a, 490b, 490c.

In embodiments, the user device 450 includes one or more components of the computer system 12 of FIG. 1. In embodiments, the user device 450 may be a smartphone, a laptop computer, a desktop computer, a smart watch, and a tablet computer, for example. In embodiments, the input device 460 includes a mouse, a keyboard, and a microphone, amongst other input device examples. In embodiments, the display device 470 is a screen which displays information to the user. In embodiments, the camera 480 is an image capturing computing device. In embodiments, the environment devices 490 are smart devices and include smartphones 490a, smart vehicles 490b, and street cameras 490c, amongst other smart devices and IoT devices.

In embodiments, the user device 450 and the environment devices 490 belong to a network of devices. In embodiments, the network is based on devices 450, 490 being within proximity to one another. In embodiments, the proximity is a specific radius of distance which encircles the user device 450 and the environment devices 490 together, e.g., a radius of less than 20 feet. As a more specific example, GPS coordinates of the user device 450 and the environment devices 490 indicate that the user device 450 is within a same building as the smartphones 490a. In further embodiments, the proximity is a specific path between the user device 450 and the environment devices 490, e.g., a path in which the user device 450 and at least one of the environment devices 490 are along a linear path. As a more specific example, GPS coordinates of the user device 450 and the environment devices 490 indicate that the user device 450 and a smart vehicle 490b are approaching one another. In alternative embodiments, an administrator determines the network. As an example, a schoolteacher creates a network which includes their own user device 450 and the smartphones 490a of students in the class. In embodiments, the administrator is able to track the environment devices 490 in the network.

In embodiments, the environment sharing server 420 includes an environment sharing module 430, which comprises one or more program modules such as program modules 42 described with respect to FIG. 1. In embodiments, the environment sharing server 420 includes additional or fewer modules than those shown in FIG. 4. In embodiments, separate modules may be integrated into a single module. Additionally, or alternatively, a single module may be implemented as multiple modules. Moreover, the quantity of devices and/or networks in the environment is not limited to what is shown in FIG. 4. In practice, the environment may include additional devices and/or networks; fewer devices and/or networks; different devices and/or networks; or differently arranged devices and/or networks than illustrated in FIG. 4.

The network 410 comprises one or more computer networks, such as one or more of a LAN, WAN, and the Internet. In one embodiment, the network 410 is representative of a cloud computing environment, such as described in FIG. 2.

In embodiments, a user traversing the surrounding environment might be at a disadvantage, since a user might tend to pay relatively more attention to their user device 450 than to the surrounding environment, potentially exposing the user to an accident. In embodiments, the environment sharing module 430 uses sensors and inputs from environment devices 490 to assist the user to avoid risks in their immediate surrounding environment.

In embodiments, a user grants permission to the environment sharing module 430 to access sensors, applications, and devices of the user device 450. In embodiments, the sensors include acoustic sensors, infrared sensors, sonar sensors, and wireless sensors, amongst other sensors. In embodiments, the applications include a GPS application, a social media application, and a calendar application, amongst other applications. In embodiments, the devices of the user device 450 include the input device 460, the camera 480, a flashlight of the user device 450, and a gyroscope of the user device 450, amongst other devices.

In embodiments, in response to receiving permission to access the sensors, the applications, and the devices of the user device 450, the environment sharing module 430 determines a location of the user device 450 by accessing the sensors, the applications, and/or the devices of the user device 450. As an example, the environment sharing module 430 determines a location of the user device 450 by accessing GPS data from a GPS application of the user device 450 and uses the GPS data to determine the location of the user device 450. As another example, in addition to or instead of accessing the GPS application, the environment sharing module 430 determines the location of the user device 450 by accessing calendar data from the calendar application. As a specific example, a calendar event in the calendar includes a location. As a more specific example, the calendar event is a business trip for the user and the location includes GPS coordinates.

In embodiments, the environment sharing module 430 receives personal information from the user, in addition to the environment sharing module 430 accessing the sensors, the applications, and/or the devices of the user device 450. Examples of personal information include medical identification.

In embodiments, in response to determining the location of the user device 450, the environment sharing module 430 retrieves public information from public sources using the location of the user device 450. In embodiments, the environment sharing module 430 retrieves the public information from the public sources by retrieving public information from the public database 445 and public networks, amongst other examples. In embodiments, the public networks are public Wi-Fi networks in the location of the user device 450. In this way, the public sources include the public database 445 and public Wi-Fi networks in the location of the user device 450. Examples of the public database 445 include a county level government public database, state government public databases, and federal government databases, amongst other examples. Examples of public information include images, infraction rates, online map data including terrain changes, weather reports, city planning materials including blueprints, building maps, geographic points of interests, zoning maps, building permits, construction sites, traffic patterns, accident reports, restaurants, and advertisements, amongst other public information. In this way, the environment sharing module 430 shares local common knowledge with the user through the user device 450. In embodiments, the environment sharing module 430 displays the public information on the display device 470 of the user device 450 through the network 410. In further embodiments, the environment sharing module 430 keeps track of locations the user has been to previously.

In embodiments, in response to determining the location of the user device 450, the environment sharing module 430 also locates the environment devices 490 in proximity to the user device 450. In embodiments, the proximity is a radius of distance surrounding the user device 450, and/or a specific path between the user device 450 and the environment devices 490, e.g., a path in which the user device 450 and at least one of the environment devices 490 are along a linear path, amongst other proximities. As an example, GPS coordinates of the user device 450 and the environment devices 490 indicate that the user device 450 is at a same building as the smart vehicle 490b. As another example, GPS coordinates of the user device 450 and the environment devices 490 indicate that the user device 450 and a smartphone 490a are approaching one another. In embodiments, the environment sharing module 430 continuously determines a location of the user device 450. Accordingly, the environment sharing module 430 also locates the environment devices 490 continuously based on the current location of the user device 450. In this way, the environment sharing module 430 is able to continuously updates new obstacles, hazards, and other information real time to the user through the user device 450 by collecting data from environment devices 490 within a proximity of a current location of the user device 450. As a more specific example, GPS coordinates of the user device 450 and the environment devices 490 indicate that the user device 450 and a smart vehicle 490b are approaching one another.

In embodiments, to locate the environment devices 490, the environment sharing module 430 accesses sensors, applications, and/or devices of the environment devices 490. In embodiments, permissions to access the sensors, the applications, and/or devices of the environment devices 490 comes from an administrator of the network in which the user device 450 and the environment devices 490 belong. In alternative embodiments, permissions to access the sensors, the applications, and/or devices of the environment devices 490 comes from each user of the environment devices 490.

In embodiments, the sensors of the environment devices 490 include acoustic sensors, infrared sensors, sonar sensors, radar sensors, and wireless sensors, amongst other sensors. In embodiments, the applications of the environment devices 490 include GPS applications, social media applications, and calendar applications, amongst other applications. In embodiments, the devices of the environment devices 490 include input devices, cameras, flashlights, and gyroscopes, amongst other devices of the environment devices 490. As an example, the environment sharing module 430 locates the environment devices 490 by accessing GPS data from GPS applications of the smartphones 490a. In this way, by accessing and using the GPS data of the environment devices 490, the environment sharing module 430 locates environment devices 490 in proximity to a location of the user device 450, and/or along a path of the user as indicated by the GPS data of the user device 450. In further embodiments, in addition to or instead of accessing the GPS applications, the environment sharing module 430 locates the environment devices 490 by accessing sensors of the environment devices 490, e.g., wireless or sonar.

In embodiments, in response to locating the environment devices 490, the environment sharing module 430 collects data from the environment devices 490. In embodiments, to collect the data, the environment sharing module 430 accesses the sensors, the applications, and/or devices of the environment devices 490. In embodiments, the data includes images from cameras of the environment devices 490. As an example, the environment sharing module 430 accesses the cameras of the smartphones 490a, the smart vehicles 490b, and the smart cameras 490c and collects image data by taking images using the cameras of the environment devices 490. In embodiments, in addition to the image data, the environment sharing module 430 including GPS data indicating a location of where the images are taken.

In embodiments, the data from the environment devices 490 also includes feedback responses from users of the environment devices 490. As an example, the environment sharing module 430 receives a feedback response from a user of a smartphone 490a regarding the location. As a more specific example, the user of the smartphone 490a sends a text message as the feedback response to the environment sharing module 430 indicating that an obstacle, e.g., a park bench, is present at the location of the smartphone 490a. In embodiments, the environment sharing module 430 stores the data from the environment devices 490 into the database 440.

In embodiments, the data from the environment devices 490 also includes data from the sensors of the environment devices. As an example, the environment sharing module 430 accesses a radar sensor of a smart vehicle 490b, which indicates that an object is present within a location of the smart vehicle 490b.

In embodiments, in response to collecting the data from the environment devices 490, the environment sharing module 430 feeds the data into a machine learning model for analysis. In further embodiments, the environment sharing module 430 also feeds the public information from the public sources into the machine learning model. In embodiments, the machine learning model is a deep learning machine learning model, e.g., generative adversarial networks (GANs). In embodiments, the training of the machine learning model occurs in view of relatively large datasets of information. These datasets include information illustrating different environmental obstacles. In embodiments, the obstacles are static and/or dynamic obstacles, including fires, people, public benches, vehicles, and commercial vendors, amongst other examples of obstacles. In embodiments, the machine learning model generates target images, with each target image illustrating a different type of obstacle. As an example, a target image illustrates an obstacle of a refuse receptacle, while another target image illustrates an obstacle of a crowd of people. In embodiments, the target images are stored within the database 440.

In embodiments, the environment sharing module 430 determines whether obstacles are present within the user environment by analyzing the data from the environment devices 490 and/or the public information from the public sources using the machine learning model. As an example, the machine learning model receives the image data of the environment devices 490 and compares an image of the image data to the target images. In embodiments, the comparison of the image to the target images includes comparing pixels in the image to pixels in a target image. As another example, the machine learning model compares images from the public information to the target images, in addition to or instead of the comparing an image of the image data to the target images.

In embodiments, in response to determining that a threshold number of pixels of an image match the pixels of the target image, the environment sharing module 430 determines that an obstacle of the target image is present in the image. Using this determination, the environment sharing module 430 determines an obstacle is present in the user's environment. In this way, the environment sharing module 430 determines whether obstacles are present by analyzing the data from the environment devices 490 and/or the public information using the machine learning model. Specifically, the environment sharing module 430 determines whether obstacles are present in the user environment using the analyzed data. In alternative embodiments, if the analysis by the machine learning model does not find a match between an image and a target image, then the environment sharing module 430 determines there are no obstacles present in the user environment.

In embodiments, the environment sharing module 430 provides alerts to the user device 450 about the obstacles using the analysis of the machine learning model. As an example, if the environment sharing module 430 determines that a park bench obstacle is present in the user's environment because a threshold number of pixels of an image from at least one of the environment devices 490 match the pixels of a target image of a park bench, and/or because a threshold number of pixels of an image from the public information match the pixels of the target image of the park bench. In response to this determination, the environment sharing module 430 provides an alert for this obstacle to the user device 450. In embodiments, the alerts include vibration alerts, audible alarm alerts, voice messaging alerts, flashlight alerts, and/or text messaging alerts, amongst other alerts. In this way, the environment sharing module 430 provides alerts to the user device 450 regarding obstacles in the user's environment, thereby enhancing safety of the user as the user traverses the environment.

In embodiments, the alert includes an image of the obstacle, i.e., the image from at least one of the environment devices 490 which matches a threshold number of pixels of the target image. In further embodiments, in addition to or instead of the image of the obstacle, the alert includes a description of the obstacle. In even further embodiments, in addition to or instead of the image of the obstacle and/or the description of the obstacle, the alert includes the feedback responses from users of the environment devices 490. In even further embodiments, in addition to or instead of the image of the obstacle and/or the description of the obstacle and/or the feedback responses, the alert includes the data from the sensors of the environment devices 490.

Examples of the environment sharing module 430 providing alerts to the user device 450 includes the environment sharing module 430 providing vibrations to the user device 450 by accessing a gyroscope feature of the user device 450 to notify the user there is an obstacle. Along with vibrating the user device 450, the alert includes a text message for display on the display device 470, with the text message describing the obstacle as a vehicle. As another example, the environment sharing module 430 provides a voice messaging alert through a speaker of the user device 450 which alerts the user regarding a mailbox obstacle, along with the image of the mailbox for display on the display device 470 of the user device 450. In embodiments, the voice messaging is set to interrupt an ongoing audio playing on the user device 450. In alternative embodiments, if the environment sharing module 430 determines there are no obstacles present in the user's environment, the environment sharing module 430 does not provide an alert to the user device 450.

In embodiments, the user provides feedback to the environment sharing module 430 regarding the alert and/or the obstacle. As an example, the user sends a text message to the environment sharing module 430 verifying that an obstacle was present in the location. In embodiments, this feedback from the user is fed into the machine learning model for further training. In embodiments, the user adjusts how the user device 450 receives the alerts from the environment sharing module 430. As an example, the user places the user device 450 in a passive mode so that only text message alerts are sent by the environment sharing module 430. As an example, a couple is walking in a beach environment and place the user device 450 in the passive mode. While in passive mode, the user device 450 receives any alerts as text messages only. In further embodiments, the user adjusts the user device 450 to receive the alerts within a specific range of the obstacle.

An example of a use scenario includes the user being a jogger that is jogging through an urban or suburban setting and taking shortcuts through parks and plazas. In this example, the user is listening to music playing on the user device 450 as they jog by using headphones. As the user continues to jog, the user device 450 receives public information from the environment sharing module 430 for the location the user is jogging in. In addition to the public information, the user device 450 receives notifications from the environment sharing module 430 regarding obstacles in the user's environment. In this example, the environment sharing module 430 provides an audible alarm notification to the user device 450 regarding an obstacle in the user's environment. In this example, the audible alarm notification interrupts the music playing on the user device 450. The user receiving the public information and the alerts from the environment sharing module 430 results in a user and other pedestrians in the user's environment to traverse the environment relatively safely.

An example of another use scenario includes a schoolteacher leading their class through a museum. In this example, the schoolteacher sets up a network which includes their user device 450 and the smartphones 490a of the students. In this example, the schoolteacher is able to tag each of the smartphones 490a of the students because the smartphones 490a belong to the network. In this way, the schoolteacher is able to track the students within the museum. Additionally, the schoolteacher receives public information from the environment sharing module 430 regarding the museum since the user device 450 is in the museum location. As an example, the environment sharing module 430 provides a building plan of the museum to the schoolteacher, thereby allowing the schoolteacher to navigate the museum safely and efficiently by using the building plans.

An example of another use scenario includes a user on a business trip and receives the public information from the environment sharing module 430. In this example, the public information includes infraction reports within a proximity of the user device 450. As another example, a user receives an alert from the environment sharing module 430 regarding a fire within a proximity of the user device 450. As another example, a user receives an alert from the environment sharing module 430 regarding a crowd of people within a proximity of the user device 450. As a further example, a user is on a cruise ship and receives public information from the environment sharing module 430, which includes a map of the cruise ship so that the user can navigate the cruise ship.

Figure 5:
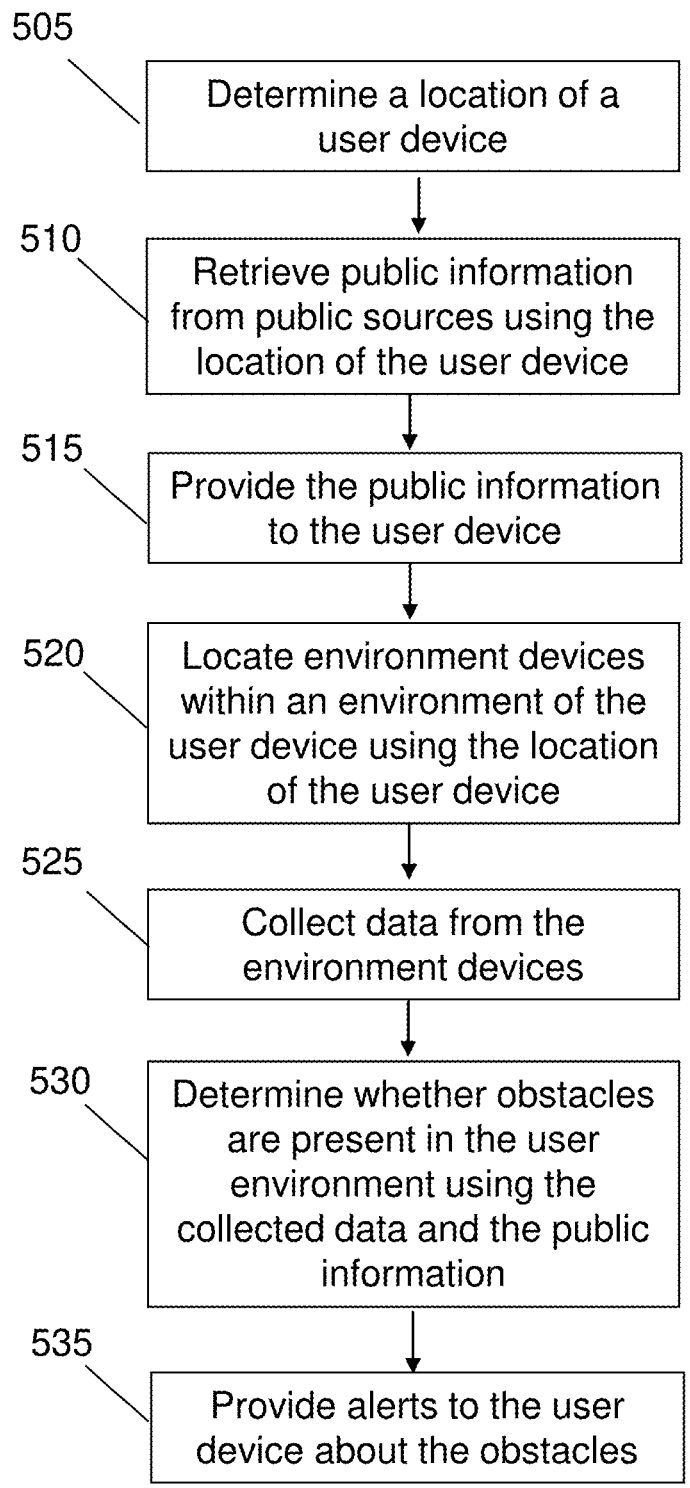
FIG. 5 shows a flowchart of an exemplary method in accordance with aspects of the invention.

FIG. 5 shows a flowchart of an exemplary method in accordance with aspects of the present invention. Steps of the method may be carried out in the environment of FIG. 4 and are described with reference to elements depicted in FIG. 4.

At step 505, the environment sharing module 430 determines a location of a user device 450. In embodiments, and as described with respect to FIG. 4, the environment sharing module 430 determines a location of the user device 450 by accessing the sensors, the applications, and/or the devices of the user device 450. In further embodiments, the environment sharing module 430 accesses GPS data from a GPS application of the user device 450 and uses the GPS data to determine the location of the user device 450.

At step 510, the environment sharing module 430 retrieves public information from public sources using the location of the user device 450. In embodiments, and as described with respect to FIG. 4, the environment sharing module 430 uses the location of the user device 450 to retrieve public information from the public database 445 and public Wi-Fi networks which are in the location of the user device 450.

At step 515, the environment sharing module 430 provides the public information to the user device 450. In embodiments, and as described with respect to FIG. 4, the environment sharing module 430 provides the public information to the user device 450 by displaying the public information on the display device 470 of the user device 450 through the network 410.

At step 520, the environment sharing module 430 locates environment devices 490 within an environment of the user device 450 using the location of the user device 450. In embodiments, and as described with respect to FIG. 4, the environment sharing module 430 accesses sensors, applications, and/or devices of the environment devices 490 to locate the environment devices 490. In further embodiments, the environment sharing module 430 accesses GPS data from GPS applications of the environment devices 490 and uses the GPS data to locate the environment devices 490.

At step 525, the environment sharing module 430 collects data from the environment devices 490. In embodiments, and as described with respect to FIG. 4, the environment sharing module 430 collects data from the environment devices 490 by accessing the sensors, the applications, and/or the devices of the environment devices 490. In further embodiments, the environment sharing module 430 collects data from the environment devices 490 by taking images using the cameras of the environment devices 490.

At step 530, the environment sharing module 430 determines whether obstacles are present in the user environment using the collected data and the public information. In embodiments, and as described with respect to FIG. 4, the environment sharing module 430 determines whether obstacles are present by analyzing the collected data from the environment devices 490 and the public information using a machine learning model. In further embodiments, the environment sharing module 430 by comparing pixels in an image from the environment devices 490 to pixels in a target image and comparing pixels in an image from the public information to the target image.

At step 535, the environment sharing module 430 provides alerts to the user device 450 about the obstacles. In embodiments, and as described with respect to FIG. 4, the alerts include vibration alerts, audible alarm alerts, voice messaging alerts, and/or text messaging alerts, amongst other alerts sent to the user device 450.

In embodiments, a service provider could offer to perform the processes described herein. In this case, the service provider can create, maintain, deploy, support, etc., the computer infrastructure that performs the process steps of the invention for one or more customers. These customers may be, for example, any business that uses technology. In return, the service provider can receive payment from the customer(s) under a subscription and/or fee agreement and/or the service provider can receive payment from the sale of advertising content to one or more third parties.

In still additional embodiments, the invention provides a computer-implemented method, via a network. In this case, a computer infrastructure, such as computer system/server 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system/server 12 (as shown in FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, comprising:

determining, by a computing device, a location of a user device;

retrieving, by the computing device, public information from public sources using the location of the user device;

providing, by the computing device, the public information to the user device;

generating, by the computing device, a plurality of target images from the public information using a machine learning model, each of the target images being a different type of obstacle;

locating, by the computing device, environment devices within an environment of the user device using the location of the user device;

collecting, by the computing device, data from the environment devices;

determining, by the computing device, whether obstacles are present in the user environment by comparing the collected data to the generated target images; and providing, by the computing device, alerts to the user device about the obstacles present in the user environment in response to the collected data matching at least one of the target images.

2. The method of claim 1, wherein the determining the location of the user device includes accessing GPS data from a GPS application of the user device and calendar data from a calendar application of the user device.

3. The method of claim 1, wherein the locating the environment devices includes accessing GPS data of the environment devices.

4. The method of claim 1, wherein the collecting the data from the environment devices includes accessing sensors, applications, and devices of the environment devices.

5. The method of claim 4, wherein the collecting the data from the environment devices includes taking images using camera devices of the environment devices.

6. The method of claim 5, wherein the determining whether the obstacles are present in the user environment includes comparing pixels in an image of the images to pixels in a target image.

7. The method of claim 1, wherein the public sources include Wi-Fi networks, and the public information of the user device includes images, infraction rates, online map data including terrain changes, weather reports, city planning material including blueprints, building maps, geographic points of interests, zoning maps, building permits, construction sites, traffic patterns, accident reports, restaurants, and advertisements.

8. The method of claim 1, wherein the public sources include a public database, and the public database includes a county level government public database, state government public databases, and federal government databases.

9. The method of claim 1, further comprising training the machine learning model for the determining whether the obstacles are present in the user environment, and the machine learning model comprises generative adversarial networks (GANs).

10. The method of claim 1, wherein the environment devices are selected from the group consisting of smartphones, smart vehicles, and smart cameras.

11. The method of claim 1, wherein the providing the alerts to the user device includes providing vibration alerts, audible alarm alerts, voice messaging alerts, and text messaging alerts.

12. The method of claim 1, wherein the computing device includes software provided as a service in a cloud environment.

13. A computer program product comprising one or more computer readable storage media having program instructions collectively stored on the one or more computer readable storage media, the program instructions executable to:

determine a location of a user device;

retrieve public information from a public database using the location of the user device;

provide the public information to the user device;

generate a plurality of target images from the public information using a machine learning model, each of the target images being a different type of obstacle;

locate environment devices within an environment of the user device using the location of the user device;

collect data from the environment devices;

determine whether obstacles are present in the user environment by comparing image data of the collected data to the generated target images;

provide alerts to the user device about the obstacles present in the user environment in response to image data of the collected data matching at least one of the target images; and provide feedback verifying that the obstacles are present in the user environment.

14. The computer program product of claim 13, wherein the alerts include images of the obstacles.

15. The computer program product of claim 13, wherein the alerts include descriptions of the obstacles.

16. The computer program product of claim 13, wherein the alerts include images and descriptions of the obstacles.

17. A system comprising:

a processor, a computer readable memory, one or more computer readable storage media, and program instructions collectively stored on the one or more computer readable storage media, the program instructions executable to:

determine a location of a user device;

retrieve public information from public networks using the location of the user device;

provide the public information to the user device;

generate a plurality of target images from the public information using a machine learning model, each of the target images being a different type of obstacle;

locate environment devices within an environment of the user device using the location of the user device;

collect data from the environment devices;

analyze pixels of image data of the collected data using the machine learning model;

determine whether obstacles are present in the user environment by comparing the pixels of the image data of the collected data to pixels of the generated target images; and provide alerts to the user device about the obstacles present in the user environment in response to a predetermined threshold number of the pixels of the image data of the collected data matching the pixels of at least one of the generated target images, wherein the alerts to the user device are provided within a predetermined range of the obstacles.

18. The system of claim 17, wherein the environment devices are IoT devices.

19. The system of claim 17, wherein the alerts include images and descriptions of the obstacles.

20. The system of claim 17, wherein the alerts include vibration alerts, audible alarm alerts, voice messaging alerts, and text messaging alerts.

* * * * *